Jan. 10, 1933. E. WIDIN 1,893,814
OIL SEAL AND SPRING
Filed May 2, 1931
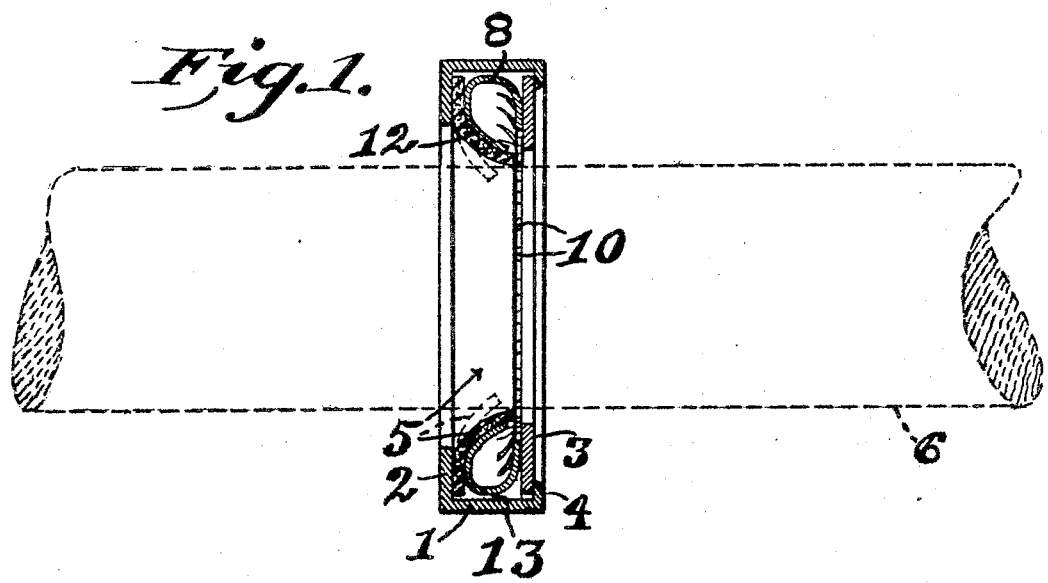
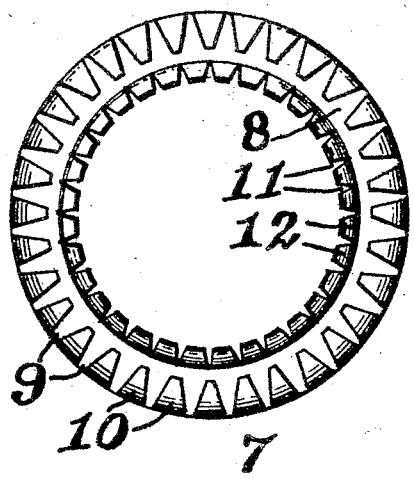 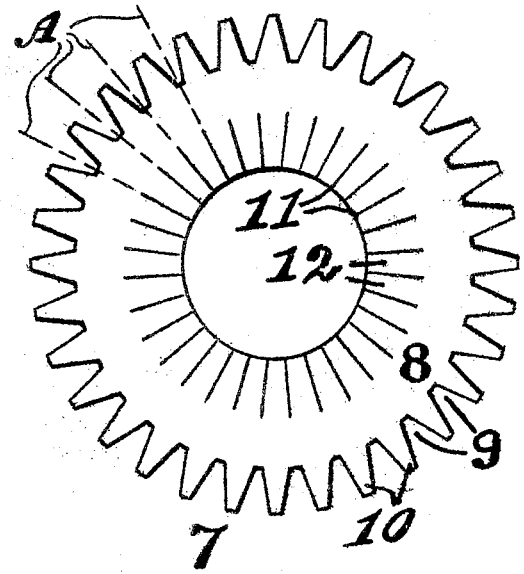
INVENTOR.
Edgar Widin.
BY
E. E. Vrooman &co.,
His ATTORNEYS.

Patented Jan. 10, 1933

1,893,814

UNITED STATES PATENT OFFICE

EDGAR WIDIN, OF ROSELLE PARK, NEW JERSEY

OIL SEAL AND SPRING

Application filed May 2, 1931. Serial No. 534,649.

This invention relates to an oil seal and spring.

An object of my invention is the construction of a simple and efficient spring device, preferably formed from a flat blank, and which is admirably adapted for use in forming a tight and efficient oil seal.

Another object of my invention is the construction of a spring device in an oil seal which will give efficient results at a minimum expense.

A further object of my invention is the construction from a single blank of a spring device having primary spring fingers on its outer edge and auxiliary spring fingers on its inner edge.

With the foregoing and other objects in view, my invention comprises certain novel constructions, combinations and arrangements of parts as will be hereinafter fully described, illustrated in the accompanying drawing, and more particularly pointed out in the appended claim.

In the drawing:

Figure 1 is a vertical, central, sectional view of an oil seal constructed in accordance with the present invention.

Figure 2 is an enlarged top plan view of my improved spring device, while

Figure 3 is a blank view of the spring device prior to being folded into the shape shown in Fig. 2.

Referring to the drawing by numerals, 1 designates an ordinary casing provided with a rear flange 2. A metal ring 3 is placed within casing 1, at its front edge, and a sealing flange 4 is bent over against ring 3 for holding it in place.

A flexible ring 5, preferably formed of leather, is placed in casing 1, so as to engage a shaft or axle designated by dotted lines 6.

To hold the flexible ring 5 tightly in engagement with shaft 6, for producing an efficient seal, I employ my improved spring device 7.

The spring device 7 is preferably formed from blank stock, of sufficient springiness or resiliency to accomplish the desired result, and comprises a circular body 8 substantially tubular in cross-section and which is notched at 9 upon its outer periphery, for producing the primary short springy fingers 10. The inner edge of body 8 is provided with slits 11 producing abutting auxiliary spring fingers 12, whereas the primary fingers are spaced apart. It is to be noted that the central part of the body is unnotched and that the slits 11 are exactly opposite the center of the notches 9, per dotted lines "A", Fig. 3, to produce great resiliency. It will, therefore, be seen that I have provided a body (substantially tubular in cross section, Fig. 1) which is furnished with spring fingers on its outer and inner edges only for the purpose hereinafter specified. By reason of said specific structure of my spring it exerts both lateral and vertical pressure.

When the device is formed into the shape shown in Fig. 2, it is ready to be inserted into the casing 1. I first place the formed leather ring 5 in the casing against the rear flange 2, then I place the spring device 7 in the casing and then the metal ring 3. After the metal ring 3 has been placed, I form the sealing flange 4 over the outer face of ring 3 whereby the oil seal is completed. There is slight clearance at 13 between the outside diameters of the leather ring and spring device, for the purpose of allowing a movement between the casing and the leather, which will correct any misalignment that there may be between the shaft and the housing into which the seal fits.

When the spring device is assembled as shown in Fig. 1, the auxiliary fingers 12 are pressing outwardly upon the shaft engaging portion of the leather ring 5, with the primary fingers 10 pressing against the inner face of metal ring 3. Therefore, a yielding spring pressure is at all times exerted upon the leather ring, sufficient to keep it in tight engagement with the shaft or axle 6.

My device 7 can be manufactured from flat stock at a minimum expense, which is in itself an advantage, and it can also be manufactured by automatic machinery, which is an additional advantage; further, its curved body structure (in cross section, Fig. 1) is efficient, in providing the primary fingers on the outer edge and the auxiliary fingers on the inner edge for the purpose hereinbefore specified.

While I have described the preferred embodiment of my invention and illustrated the same in the accompanying drawing, certain minor changes or alterations may appear to one skilled in the art to which this invention relates, during the extensive manufacture of the same, and I, therefore, reserve the right to make such changes or alterations as shall fairly fall within the scope of the appended claim.

What I claim is:

As a new article of manufacture, a spring device of the class described, comprising a circular body substantially tubular in cross-section and provided with short notches on its outer edge and with short slits on its inner edge, said body being solid throughout its length between the inner ends of all of said short notches and short slits, and said tubular body adapted to exert both lateral and vertical pressure.

In testimony whereof I hereunto affix my signature.

EDGAR WIDIN.